United States Patent
Simons et al.

(10) Patent No.: US 8,891,082 B2
(45) Date of Patent: Nov. 18, 2014

(54) TEMPERATURE-COMPENSATED SPECTROMETER

(75) Inventors: Rainer Simons, Kranenburg (DE); Armin Schmidt, Goch (DE)

(73) Assignee: Bruker Elemental GmbH, Kalkar (DE)

( * ) Notice: Subject to any disclaimer, the term of this patent is extended or adjusted under 35 U.S.C. 154(b) by 0 days.

(21) Appl. No.: 13/579,838

(22) PCT Filed: Feb. 15, 2011

(86) PCT No.: PCT/DE2011/075024
§ 371 (c)(1), (2), (4) Date: Aug. 17, 2012

(87) PCT Pub. No.: WO2011/100967
PCT Pub. Date: Aug. 25, 2011

(65) Prior Publication Data
US 2012/0327416 A1    Dec. 27, 2012

(30) Foreign Application Priority Data
Feb. 21, 2010   (DE) .......................... 10 2010 000 490

(51) Int. Cl.
*G01J 3/28*    (2006.01)
*G01J 3/20*    (2006.01)
*G01J 3/02*    (2006.01)
*G01J 3/443*    (2006.01)

(52) U.S. Cl.
CPC ................. *G01J 3/20* (2013.01); *G01J 3/0286* (2013.01); *G01J 3/02* (2013.01); *G01J 3/443* (2013.01)
USPC ........................................ 356/328

(58) Field of Classification Search
USPC ............................................... 356/328; 349/5
See application file for complete search history.

(56) References Cited

U.S. PATENT DOCUMENTS

| | | | |
|---|---|---|---|
| 3,503,685 A | | 3/1970 | Driscoll et al. |
| 6,556,297 B1 * | | 4/2003 | Cappiello ..................... 356/328 |
| 2004/0239931 A1 | | 12/2004 | Teichmann et al. |
| 2010/0265419 A1 * | | 10/2010 | Hayashi et al. .................. 349/5 |

OTHER PUBLICATIONS

International Search Report, mailed Jul. 22, 2011, for PCT/DE2011/075024, 4 pages.

* cited by examiner

*Primary Examiner* — Tarifur Chowdhury
*Assistant Examiner* — Jamil Ahmed
(74) *Attorney, Agent, or Firm* — Seed IP Law Group PLLC

(57) ABSTRACT

The invention relates to a spectrometer comprising a hollow main optical body having at least one light channel, a light source, a diffraction grating having a grating central point, a light inlet opening, and a detector unit, which are arranged in such a way that the focal curve of the spectrometer satisfies the back focus equation. In order to create a spectrometer having sufficient spectral resolution from a low-price, light, and easy-to-process material, which spectrometer is able to operate in a large temperature interval even without thermostatic control, according to the invention the light inlet opening is arranged on a compensation body, the compensation body is arranged in the light channel and fastened to the main optical body between the light source and the diffraction grating, and the compensation body is dimensioned in such a way that the compensation body changes the distance between the light inlet opening and the grating central point when the main optical body thermally expands.

10 Claims, 1 Drawing Sheet

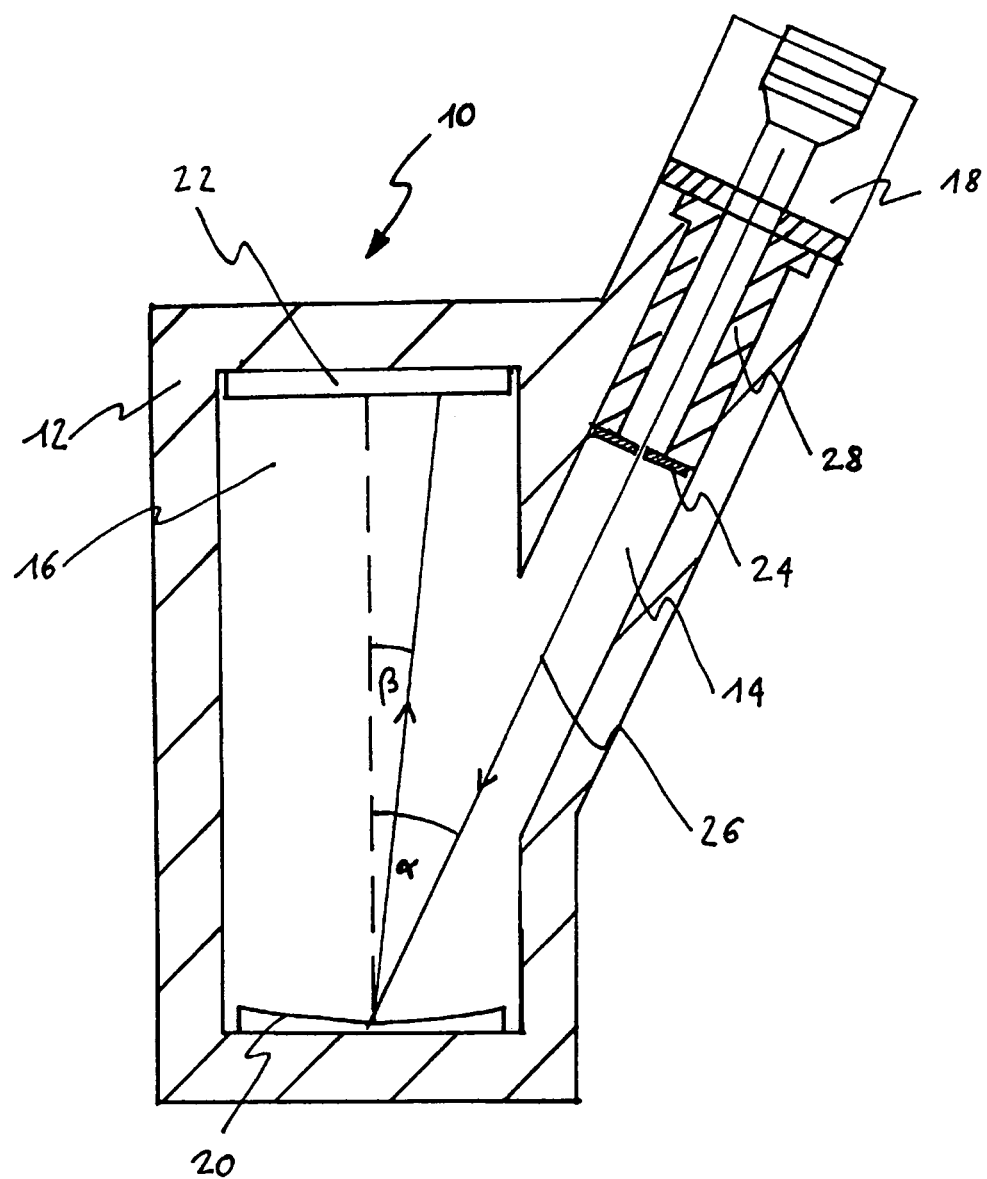

TEMPERATURE-COMPENSATED SPECTROMETER

CROSS-REFERENCE TO RELATED APPLICATION

This application is a U.S. national stage application filed under 35 U.S.C. §371 of International Patent Application PCT/DE2011/075024, accorded an international filing date of Feb. 15, 2011, which is incorporated herein by reference in its entirety.

TECHNICAL FIELD OF THE INVENTION

The invention relates to a temperature-compensated spectrometer having a hollow main optical body having at least one light channel, one light source, one light inlet opening, one diffraction grating and a detector unit, which are arranged so that the focal curve of the spectrometer satisfies the back focus equation.

BACKGROUND OF THE INVENTION

Spectrometers for the spectral decomposition and measurement of light from emission processes, produced by evaporation and excitation of materials in hot plasmas (arc discharge in air atmosphere spark discharge in argon, ICP, lasers etc.) are known in many diverse embodiments.

Generally spectrometers comprise a light inlet opening which is punctiform or linear and can be designed as single or multiple opening. The light to be decomposed either passes through a light guide or a light guide bundle from the location of plasma generation to the light inlet opening which is then potentially far removed (10 m and more are possible for wavelengths from about 230 mm) or goes directly from an outwardly closed, possibly argon- or nitrogen-gas-flushed or evacuated light channel direction from the location of the plasma generation to the light inlet opening. In the latter case, the optical system must be located very close to (at most a few decimeters away from) the location of the plasma generation and be aligned relative thereto.

The orientation and extension of the non-punctiform light inlet opening plays a role in the dimensioning and positioning of imaging elements and diaphragms in the light channel between light source and light inlet opening since it must be ensured that the analytically relevant plasma regions can be completely accommodated by the optical system.

From the light inlet opening, the light to be decomposed passes to one or more simultaneously or successively operating imaging and dispersive elements. The dispersive elements can be prisms or mechanically or holographically produced diffraction gratings. Spherical or aspherical mirrors are used as imaging elements.

The structure of the optical system is simplified when using reflection-coated, spherical and concave diffraction gratings since in such systems dispersion and imaging is accomplished by one and the same optical element.

Depending on the shape and density of the diffracting structure applied to the spherical surface of the diffraction grating (shape and spacing of the grating lines), the radius of curvature of the spherical surface of the diffraction grating and the distance of the light inlet opening from the centre of symmetry of the grating lines on the grating surface (grating central point), the so-called inlet back focal length, the spectral lines of certain well-known wavelengths characteristic of a material to be analysed are found in the structure of the optical system at certain diffraction angles which can be calculated with the aid of the so-called grating equation and at certain diffraction-angle-dependent distances from the grating central point (outlet back focal lengths).

The grating equation:

$$nG\lambda = \sin\alpha + \sin\beta \qquad (1)$$

describes which wavelength $\lambda$ appears in which diffraction order n at given line density or grating constant C (given in lines per mm) at which diffraction angle $\beta$, when the angle of incidence $\alpha$ of the light to be decomposed is known. The angles are here plotted on the so-called grating normal. This is the connecting line between grating central point and curvature central point of the grating surface.

The curve that describes the angle- and distance-dependent position of spectral lines of given wavelengths relative to the grating central point is called the focal curve. The best known special case of a focal curve is the Rowland circle in the so-called Paschen-Runge mounting of a concave grating. In this case, grating central point, light inlet opening and detector unit are located tangentially arranged on a circle whose diameter corresponds to the radius of curvature of the concave grating and whose plane is designated as dispersion plane In contrast to the Paschen-Runge mounting, the focal curve of a flat field grating runs flatter or sometimes in an S-shape.

The generally valid formula for the profile of focal curve of Rowland circle and flat field gratings in the dispersion plane is the back focus equation:

$$\frac{\cos^2\alpha}{L_A} - \frac{\cos\alpha}{R} + \frac{\cos^2\beta}{L_B} - \frac{\cos\beta}{R} - n\lambda K = 0 \qquad (2)$$

where:
$\alpha$ is the angle of incidence;
$\beta$ is the diffraction angle;
$L_A$ is the inlet back focal length;
$L_B$ is the outlet back focal length;
R is the grating radius (radius of curvature of the spherical grating surface);
n is the diffraction order (integer, positive or negative);
$\lambda$ is the wavelength (at diffraction angle $\beta$);
K is the spherical grating constant, depending on line shape.

From the back focus equation (2) it follows for K=0 (Rowland circle grating) that all the outlet back focal lengths must lie on one circle if the inlet back focal length and the grating central point lie on the same circle. In addition, it can be generally derived that a shortening or lengthening of the inlet back focal length by an amount $\Delta L$, to a good approximation changes all the outlet back focal lengths by the same amount but with opposite sign.

Since the materials of which spectrometers are usually constructed usually do not have negligible coefficients of thermal expansion, temperature fluctuations have an influence on the measurement. The length extension of a given material with a temperature difference $\Delta T$ is determined by the corresponding coefficient of linear thermal expansion $\alpha$:

$$l_2 = l_1(1+\alpha\Delta T) \qquad (3)$$

where:
$\Delta T$ is the temperature difference;
$l_1$ is the initial length;
$l_2$ is the end length;
$\alpha$ is the coefficient of linear thermal expansion.

In a spectrometer the thermal expansion has various consequences. If a diffraction grating is applied to a substrate, which has a non-negligible coefficient of thermal expansion α, the grating constant varies with the temperature and the diffraction angle is therefore temperature-dependent (cf. grating equation (1)). This effect is manifest in a wavelength-dependent positional drift of the optical system.

When detecting the (complete) spectrum with spatially resolving sensors (e.g. CCD or CMOS detectors), the positional drift can easily be compensated by means of a superpositionable drift reference spectrum within the framework of a reference measurement. A software-dependent spectrum tracking can also be implemented by means of the continuous observation of spectral structures or sections which continually reoccur and are comparable for a plurality of samples. Such methods have been available for many years in the prior art and in a plurality of spectrometers.

Tracking the detector unit tangentially to the focal curve is feasible and is described for individual detectors in DE 10 2004 061 178 A1.

EP 1 041 372 A1 proposes a solution in which the detector unit of a spectrometer is mounted on a support material having a high coefficient of thermal expansion and is fixed to the main optical body so that when thermal expansion occurs, the centre of the detector unit follows the wavelength-dependent spectral shift resulting from the change in the grating constant to a good approximation. However, a change in the focal position is not compensated or eliminated in this structure since the measuring task to be fulfilled does not require any exactly held focal position.

As is described in DE 10 2004 061 178 A1 and generally known, the focusing of an optical system is part of its basic alignment which can only be accomplished by means of the movement of the light inlet opening if the detector units are correctly position on the (instantaneous) focal curve of the system. However, if the back focal lengths vary as a function of the temperature, because the coefficients of thermal expansion of the materials used cannot be neglected (cf. back focus equation (2)), the optical system varies its focal curve (defocusing) as a function of temperature and thereby loses spectral resolution since with increasing temperature all the spacings in the system enlarge but the outlet back focal length must become smaller if the back focus equation is to be satisfied and therefore the focal position or spectral resolution should be preserved with increasing inlet back focal length.

To compensate for the effect just described, it is suggested in DE 10 2004 061 178 A1 to re-focus the light inlet opening by means of actuators and thus optimise the sharpness of the image. The optimum can then be found and re-adjusted by means of an algorithm within the framework of a reference measurement. Alternatively spectrometers can be dimensioned so that within a predefined temperature interval, only small changes in the spectral resolution of the system occur as a result of defocusing due to thermal expansion. A condition for the permissible defocusing at a given maximum temperature, is remaining within the depth of focus interval of the optical system:

$$t_w = \frac{n\lambda}{A^2} \quad (4)$$

where:
$t_w$ is the wave-optical depth of focus;
n is the diffraction order;
λ is the wavelength;
A is the aperture (depending on the grating illumination and the grating radius).

By selecting materials having a very low or no coefficient of thermal expansion α and/or keeping the operating temperature T of the optical system constant (thermostatic control) and/or active tracking either of the light inlet opening or of the detector unit or both assemblies by means of linear motors, piezo-actuators and the like, the consequences of the thermal expansion can be limited or completely eliminated if the entire system could or must be exposed to a broad temperature interval.

In practice, analytical devices fitted with spectrometers, in particular portable and mobile systems which possibly should also be battery-operated, are subject to some restrictions. Portable systems should be as light as possible and nevertheless have a sufficient and as far as possible constant spectral resolution capacity. Waiting times for switching a system on again after longer operating pauses should be as short as possible.

Reference measurements during measurement operation are perceived as disturbing and should therefore be restricted to a minimum. However, complex mechanical actuator-based tracking systems are potentially liable to breakdown. In addition, they are relatively expensive and increase the overall size of spectrometers fitted with them.

A further disadvantage of known thermostatic controls of optical systems of spectrometers is that they shorten the operating life in battery operation of a spectrometer, in some cases even quite considerably.

Special alloys or ceramics having very low, almost negligible coefficients of thermal expansion are very expensive and additionally usually very difficult to process. Non-metallic materials are usually only available as thin plate material so that frequently not all the required processings can be carried out problem-free such as, for example, the manufacture of clearances and threaded bores. The manufacture of compact spatial structures is considerably simpler with metal materials but the said special alloys are not only expensive but also very heavy and therefore unsuitable for portable systems.

DISCLOSURE OF THE INVENTION

It is the object of the invention to provide a spectrometer having sufficient spectral resolution made of an inexpensive, light and each to process material which can nevertheless operate in a large temperature range without thermostatic control or active corrections by arbitrary actuators.

The object is solved by a spectrometer having the features of claim 1. Advantageous embodiments and further developments are the subject matter of the subclaims.

Further details and advantages of the invention are obtained from the following description of purely exemplary and non-restrictive description of an exemplary embodiment in conjunction with the drawing.

BRIEF DESCRIPTION OF THE DRAWING

FIG. 1 shows a section through a preferred embodiment of a spectrometer according to the invention.

DESCRIPTION OF PREFERRED EMBODIMENTS

FIG. 1 shows a spectrometer 10 having a hollow main optical body 12 with at least one light channel 14. The light channel 14 is here designed as a cylindrical bore and connected to the cavity 16 of the main optical body 12, where the axis f the light channel 14 runs parallel to the light incidence axis 26.

The main optical body 12 can also have a plurality of channels which are then preferably arranged so that the appurtenant light incidence axes do not have the same light incidence angle α. Thus, the spectral range covered by the detector unit used can be extended by means of sequential measurements of the light from the different light inlet openings or the positional stability of the system can be ensured by observation and evaluation of a reference spectrum additionally coupled in via another light inlet opening.

The main optical body 12 is preferably formed in one piece, so that stresses which accompany a thermal expansion can be reduced to a minimum. One-piece fabrication also has the advantage that the use of seals and the like can be reduced to a minimum if a vacuum or a particular noble gas atmosphere is desired in the cavity.

A light source 18 is located at the end of the light channel 14, which is remote from the cavity 16. Located at the other end of the light channel 14 is a diffraction grating 20 in the cavity 16. A detector unit 22 is located on the side of the cavity 16 opposite the diffraction grating 20. The detector unit 22 can be formed singly or it can be formed from a plurality of different sensors. In particular semiconductor detectors or phototubes are suitable as sensors.

A light inlet opening 24 is also located in the light channel 14 along the light incidence axis 26 between light source 18 and diffraction grating 20. Light inlet opening 24, diffraction grating 20 and detector unit 22 are arranged so that the focal curve satisfies the back focus equation (2).

The light inlet opening preferably has a gap width between 20 and 5 μm and is preferably made of a material having a negligible coefficient of thermal expansion, that is a coefficient of thermal expansion that is so low that under the usual conditions of use of the spectrometer, the thermal expansion of the light inlet opening can be neglected. The gap is preferably produced with lasers or by photoetching.

The spectrometer according to the invention is used for intensity measurement with semiconductor detectors or phototubes. The focal curve of the spectrometer satisfies the back focus equation (2) where the main optical body 12 is made of a material having coefficient of thermal expansion α.

In the case of a larger increase in temperature, thermal expansion effects occur in many materials which shift the focal curve beyond the depth of focus interval $t_w$ of the optical system. In conventional spectrometers this so-called temperature defocusing results in a reduced spectral resolution and therefore to a loss of optical information and therefore ultimately to more inaccurate measurement results.

This problem occurs in particular when the main optical body is made of an aluminium or magnesium alloy. Such alloys certainly have a low weight and are very simple and precise to process so that complex spatial structures can be produced but they have a relatively large coefficient of thermal expansion which rapidly leads to perceptible thermal expansion effects even in small focal length systems such as, for example, a flat field optics. For example, when using aluminium alloys a noticeable intensity drop (>10%) in the measurement signal can be observed even with a 5° C. rise in temperature although the full widths at half maximum do not yet vary everywhere on the detector.

The intensity drop is exclusively due to the defocusing since the positional stability of each optical system can preferably be corrected by active drift compensation by means of the observation and evaluation of a drift reference spectrum additionally coupled in via a wider light inlet opening such as an Ne spectrum.

The spectrometer according to the invention now allows such materials to be used to produce the main optical body and nevertheless dispense with thermostatic control of the optical system so that a cost-effective transportable spectrometer can be provided. Here the invention is based on the finding that a defocusing can be corrected by correcting the inlet back focal length (cf. back focus equation (2)), which is also part of the adjustment process in which the light inlet opening is moved along the light incidence axis (connecting line between light inlet opening and grating central point) until the full widths at half maximum of the spectral lines to be measured reach a predefined desired value on the focal curve.

According to the invention, an active, permanent temperature-dependent correction of the inlet back focal length can be achieved by means of a compensation body. To this end the light inlet opening 24 is disposed on a compensation body 28 whereby the thermal expansion of the main optical body 12 and the shift of the focal curve can be corrected.

The compensation body 28 is preferably fabricated from a plastic having a high dimensional stability, having a high coefficient of thermal expansion α which however is easy to process. Polyoxymethylene (POM), for example, is suitable for this purpose. POM is a plastic having a coefficient of thermal expansion α which is approximately 4.5 times greater than that of aluminium.

The compensation body 28 is advantageously configured to be substantially tubular and is arranged in the light channel 14 so that the tube axis of the compensation body 28 runs along the light incidence axis 20.

The light inlet opening 24 is fixed at one end of the tubular compensation body 28 directly or via a connecting piece. The end of the tubular compensation body 28 opposite the light inlet opening 24 is fixed on the main optical body 12. To this end, the compensation body can be provided at one end with an overhanging edge in order to clamp it, for example, between light source 18 and main optical body 12 so that its one end is fixed and the other end can expand in the light channel 14.

As a result of the arrangement according to the invention, during thermal expansion of the main optical body 12 and with correct dimensioning of the compensation body 28 there is a net movement of the light inlet opening 24 in the direction of the grating central point and therefore a decrease in the inlet back focal length. Consequently the expansion of the compensation body 28 is overcompensated by the expansion of the main optical body 12.

The net movement can be designed so that in the event of temperature variations the necessary correction of the inlet back focal length is made and the focal position of the spectrometer can thus also be kept constant within large temperature ranges.

Preferably during the variation of the inlet back focal length caused by thermal expansion or contraction of the individual components of the spectrometer the focal curve is still present for temperatures between 10° C. and 55° C. on the detector unit.

Alternatively the compensation body can be configured as bimetal disk, which is accordingly dimensioned, oriented perpendicular to the light incidence axis and drilled out concentrically. Greater compensation paths can thus be covered. Large compensation paths are required on account of the size of the system particularly in long focal-length optical systems.

Numerous modifications and further developments are possible within the inventive idea, which relate for example to the type and configuration of the compensation body and its fastening. For example, the compensation body can in principle have other basic shapes instead of the cylindrical one shown or a plurality of the same or different compensation bodies can be combined.

LIST OF REFERENCE NUMBERS

10 Spectrometer
12 Main optical body
14 Light channel
16 Cavity of main optical body
18 Light source
20 Diffraction grating
22 Detector unit
24 Light inlet opening
26 Light incidence axis
28 Compensation body

The invention claimed is:

1. A spectrometer, comprising:
a hollow main optical body having at least one light channel;
a light source;
a diffraction grating having a grating central point;
a light inlet opening; and
a detector unit, which are arranged so that a focal curve of the spectrometer satisfies a back focus equation:

$$\frac{\cos^2\alpha}{L_A} - \frac{\cos\alpha}{R} + \frac{\cos^2\beta}{L_B} - \frac{\cos\beta}{R} - n\lambda K = 0$$

where
$\alpha$ is an angle of incidence,
$\beta$ is a diffraction angle,
$L_A$ is an inlet back focal length,
$L_B$ is an outlet back focal length,
R is a grating radius indicative of a radius of curvature of a spherical grating surface,
n is a diffraction order,
$\lambda$ is a wavelength at the diffraction angle $\beta$ and
K is a spherical grating constant, and further comprising:
a compensation body, the light inlet opening disposed on the compensation body, the compensation body disposed in the light channel and fixed on the main optical body between the light source and the diffraction grating, the compensation body configured so that during thermal expansion of the main optical body the compensation body changes the distance between the light inlet opening and the grating central point such that a shift of the focal curve is corrected by overcompensating the thermal expansion of the main optical body by expansion of the compensation body.

2. The spectrometer according to claim 1, wherein the light inlet opening is located at a first end of the compensation body and a second end of the compensation body is fixed on the main optical body between the light inlet opening and the light source.

3. The spectrometer according to claim 1, wherein the compensation body is substantially tubular.

4. The spectrometer according to claim 1, wherein the compensation body is made of polyoxymethylene plastic (POM).

5. The spectrometer according to claim 1, wherein the compensation body is a concentrically drilled bimetal disk.

6. The spectrometer according to claim 1, wherein light transmission to the light inlet opening takes place via a light guide.

7. The spectrometer according to claim 1, wherein the main optical body is one piece.

8. The spectrometer according to claim 1, wherein the spectrometer has a plurality of light channels.

9. The spectrometer according to claim 1, wherein the light inlet opening is made of a material having a negligible coefficient of thermal expansion.

10. The spectrometer according to claim 1, wherein the light inlet opening is disposed on a connecting piece, and the connecting piece is disposed on the compensation body.

* * * * *